(12) United States Patent
Mankovskii et al.

(10) Patent No.: US 9,965,340 B2
(45) Date of Patent: May 8, 2018

(54) GRAPH-ENHANCED EVENT MANAGEMENT

(71) Applicant: CA, Inc., New York, NY (US)

(72) Inventors: Serguei Mankovskii, Morgan Hill, CA (US); Victor Muntés-Mulero, Barcelona (ES); Marc Solé Simó, Barcelona (ES)

(73) Assignee: CA, Inc., New York, NY (US)

( * ) Notice: Subject to any disclaimer, the term of this patent is extended or adjusted under 35 U.S.C. 154(b) by 0 days. days.

(21) Appl. No.: 15/084,872

(22) Filed: Mar. 30, 2016

(65) Prior Publication Data
US 2017/0286189 A1 Oct. 5, 2017

(51) Int. Cl.
*G06F 3/00* (2006.01)
*G06F 9/54* (2006.01)

(52) U.S. Cl.
CPC .................... *G06F 9/542* (2013.01)

(58) Field of Classification Search
CPC ..................................... G06F 9/542
USPC ......................................... 719/318
See application file for complete search history.

(56) References Cited

U.S. PATENT DOCUMENTS

| 7,626,948 | B1 * | 12/2009 | Cook | H04L 45/48 370/256 |
| 7,738,648 | B1 * | 6/2010 | Agarwal | H04M 7/128 379/221.03 |
| 8,019,377 | B2 * | 9/2011 | Watanabe | H04L 12/6418 455/550.1 |
| 8,280,461 | B2 * | 10/2012 | Williams | G06F 1/1626 345/179 |
| 8,290,461 | B1 * | 10/2012 | Sankaran | H04B 1/0475 455/232.1 |
| 9,832,162 | B2 * | 11/2017 | Cai | H04L 51/32 |
| 2015/0256626 | A1 * | 9/2015 | Ajitomi | H04L 67/141 709/227 |
| 2015/0379603 | A1 * | 12/2015 | Gupta | G06Q 30/0617 705/26.43 |
| 2016/0035046 | A1 * | 2/2016 | Gupta | G06Q 50/01 705/7.29 |
| 2017/0039297 | A1 * | 2/2017 | Koutrika | G06F 17/21 |

OTHER PUBLICATIONS

Ying Liu, Survey of Publish Subscribe Event Systems, 2003.*

* cited by examiner

*Primary Examiner* — Lechi Truong
(74) *Attorney, Agent, or Firm* — Gilliam IP PLLC

(57) ABSTRACT

A first event notification is received. The first event notification is associated with a first event. Criteria is determined based, at least in part, on the first event notification. A first component is identified based, at least in part, on the criteria a component graph. An operational status associated with the first component is determined. It is determined not to generate a second event notification based, at least in part, on the operational status.

15 Claims, 4 Drawing Sheets

GRAPH-ENHANCED EVENT MANAGEMENT

BACKGROUND

The disclosure generally relates to the field of computing systems, and more particularly to event management.

A monitoring system may include a set of agents and an event monitoring system. The agents reside in locations that allow the agents to monitor various aspects of a computing system. For example, an agent may execute as a process on a router, thus allowing the agent to monitor various aspects of the router and the associated network(s). As another example, an agent may be embedded in a software application, allowing the agent to monitor various aspects of the software application.

The agents detect events associated with the components the agents are monitoring. An event can widely vary depending on the particular aspect(s) being monitored. For example, an error or exception generated by a software application may be an event. As another example, a particular network measurement/metric exceeding a threshold may be an event.

When an agent detects an event, the agent generates and sends an event notification to the event management system. The event management system processes the event notification using various techniques. For example, the event management system may identify a rule associated with the event notification or may use statistical analysis to identify anomalies. The event management system may take various actions in response to receiving and processing an event notification. For example, the event management system may generate another event notification or forward the received event notification.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to generating alerts in illustrative examples. But aspects of this disclosure can be applied to generating event notifications generally. In other instances, well-known instruction instances, protocols, structures and techniques have not been shown in detail in order not to obfuscate the description.

Rule or statistics-based techniques may not take into account relationships between components. Ignoring relationships between components can result in event notifications that are redundant. For example, consider a monitoring system that monitors various aspects of a network. The monitoring system may detect when the network components do not respond to messages (e.g., pings). The status of a particular network component may impact the status of another network component. For example, if a particular router is not operational, a server coupled with the network via the router may not respond to messages, and may thus appear to be non-operational as well. Thus, the event monitoring system may erroneously determine that both components are non-operational and may generate event notifications indicating to an administrator that both components are non-operational. By not taking into account the relationships between components, event monitoring systems may generate duplicative and unnecessary event notifications.

Figure 1:
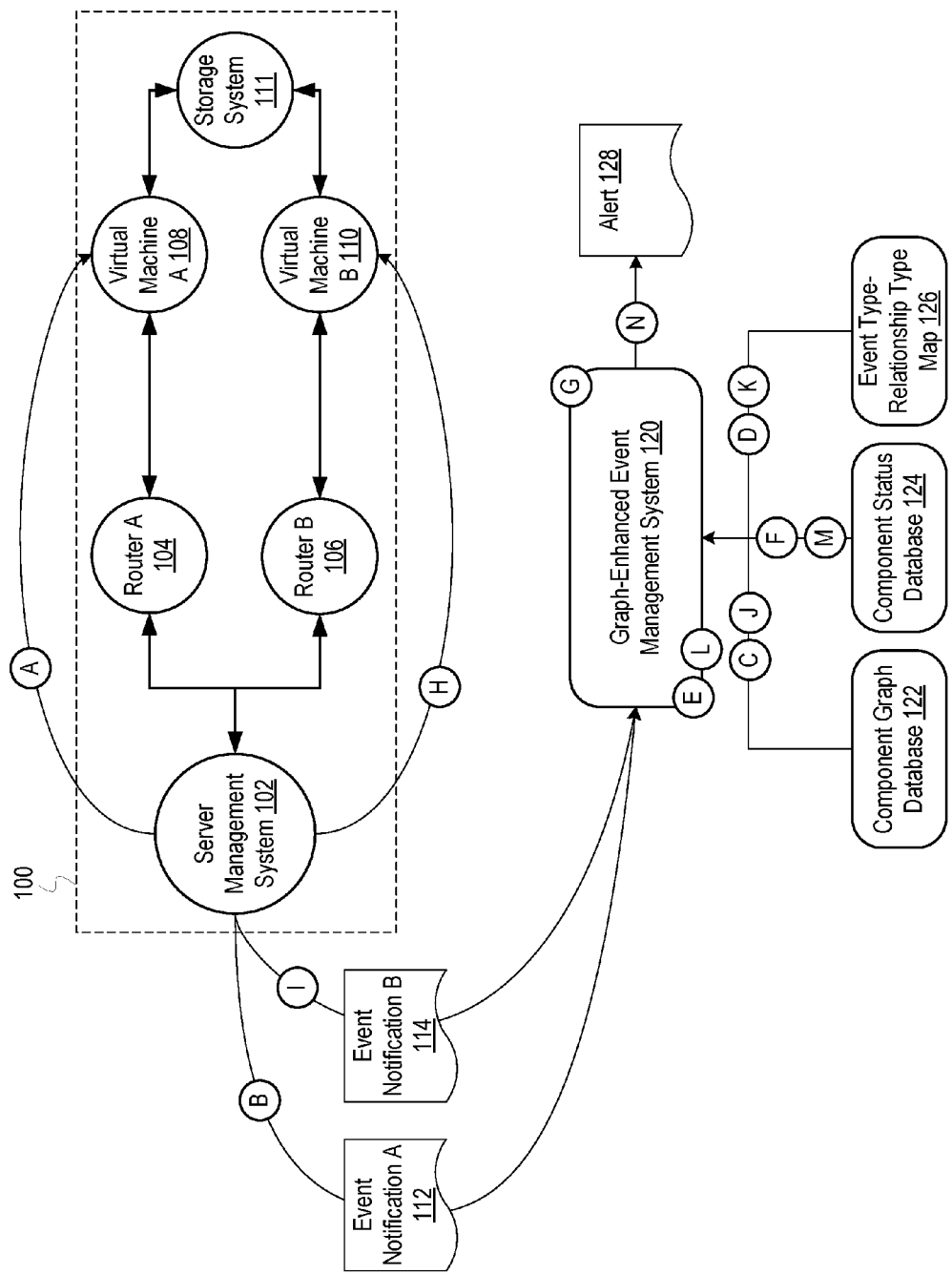
FIG. 1 depicts the operations of an example graph-enhanced event management system.

To reduce duplicative and unnecessary event notifications, an event monitoring system may take into account the relationships between monitored components. In particular, when an event monitoring system receives an event notification, the event monitoring system determines a relationship type based, at least in part, on one or more event characteristics associated with the event. The event characteristics can be an event type, indication of a failed test, etc. The event monitoring system utilizes a component graph and the relationship type to identify one or more relevant components. The event monitoring system then determines operational statuses of the relevant components and determines whether a new event notification (e.g., an alert), should be generated FIG. 1 depicts the operations of an example graph-enhanced event management system. FIG. 1 depicts a graph-enhanced event management system (hereinafter "event management system") 120 and a network of components (hereinafter "network") 100. The network 100 comprises a server management system 102, router A 105, router B 106, virtual machine A 108, virtual machine B 110 and storage system 111. The server management system 102 performs various management operations associated with the network 100. For example, the server management system 102 may identify new components, monitor the status of the current components, etc. The event management system 120 is communicatively coupled to a component graph database 122, a component status database 124, and an event type-relationship type map 126. Although depicted as being independent of the event management system 120, the component graph database 122, component status database 124, and event type-relationship type map 126 may be part of the event management system 120.

Figure 2:
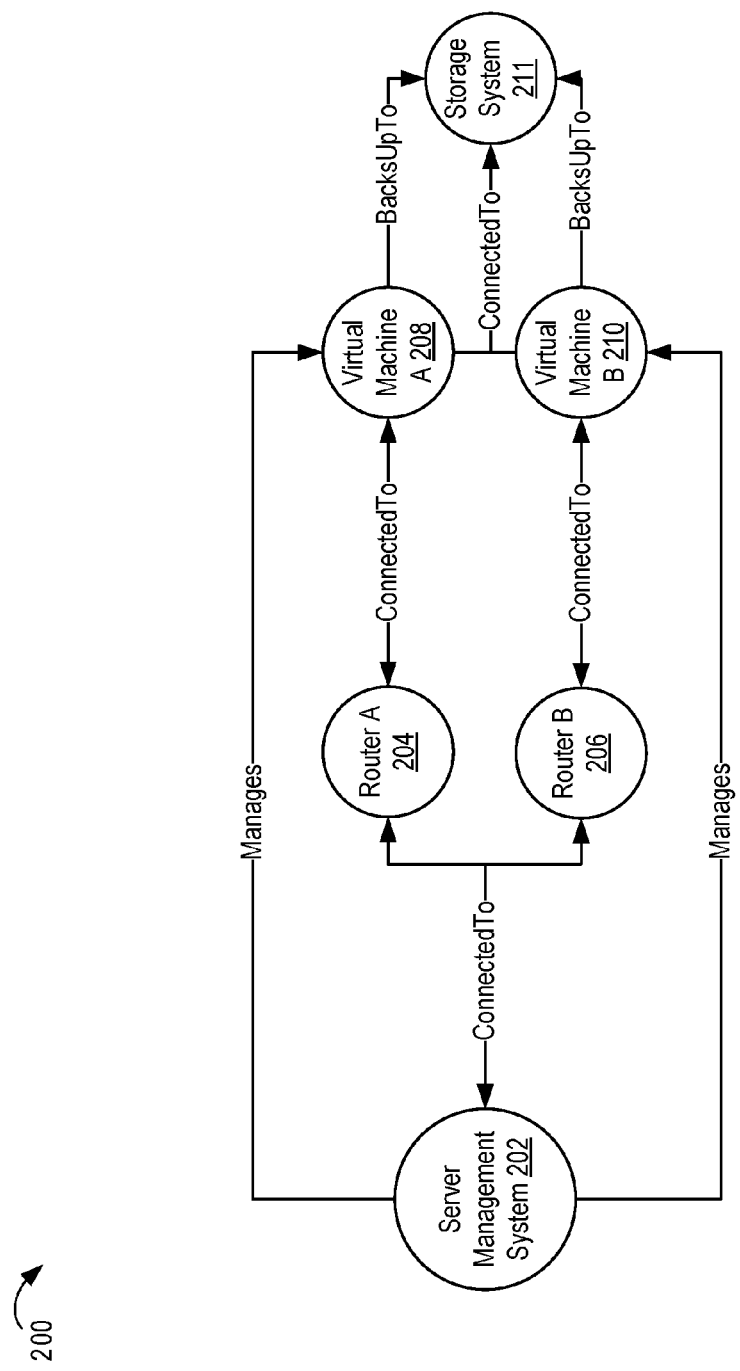
FIG. 2 depicts a visual representation of an example component graph corresponding to a network.

FIG. 2 depicts a visual representation of an example component graph corresponding to the network 100. FIG. 2 depicts a visual representation of a component graph 200 which includes nodes corresponding to each of the components of the network 100 and edges corresponding to relationships between the components. In particular, node 202 corresponds to the server management system 102, node 204 corresponds to router A 104, node 206 corresponds to router B 106, node 208 corresponds to virtual machine A 108, node 210 corresponds to virtual machine B 110, and node 211 corresponds to the storage system 111. The visual representation of the component graph 200 is discussed in more detail below.

At stage A, the server management system 102 determines that virtual machine A 108 is inaccessible. The technique used by the server management system 102 to determine that a component of the network 100 is inaccessible can vary. For example, the server management system 102 may send a message (e.g., a "ping") to virtual machine A 108 and wait a predetermined amount of time for a response. If the server management system 102 does not receive a response within the predetermined amount of time (i.e., times out), the server management system 102 determines that virtual machine A 108 is not accessible.

At stage B, the server management system 102 notifies the event management system 120 that virtual machine A 108 is inaccessible. The server management system 102 notifies the event management system 120 by generating and sending event notification A 112. Event notification A 112 may include metadata associated with the detected event, including event characteristics. In this example, the metadata included with event notification A 112 indicates the type of event and the component(s) associated with the event (e.g., virtual machine A 108). In some implementations, event notifications may include additional metadata, such as when the event occurred, an event severity, metrics associated with the event, etc.

At stage C, in response to receiving event notification A 112, the event management system 120 retrieves a component graph from the component graph database 122. To retrieve the component graph, the event management system 120 may send a query to the component graph database 122. The query may identify the network 100, the component associated with the event (e.g., virtual machine A 108), or include other data that can be used to identify the particular component graph. In some instances, there may be a single component graph, making identification of the relevant component graph optional. The component graph typically identifies components as nodes of the component graph and relationships between components as edges of the component graph. For example, as depicted in FIG. 2, the component graph 200 includes nodes corresponding to the server management system 102 (node 202) and router A 104 (node 204) as nodes connected by an edge corresponding to a "ConnectedTo" relationship type. Table 1 depicts an example representation of the component graph 200 suitable for storing.

TABLE 1

| Component A | Relationship Type | Component B |
| --- | --- | --- |
| Server Management System | ConnectedTo | Router A |
| Server Management System | ConnectedTo | Router B |
| Server Management System | Manages | Virtual Machine A |
| Server Management System | Manages | Virtual Machine B |
| Router A | ConnectedTo | Virtual Machine A |
| Router B | ConnectedTo | Virtual Machine B |
| Virtual Machine A | BacksUpTo | Storage System |
| Virtual Machine B | BacksUpTo | Storage System |
| Virtual Machine A | ConnectedTo | Storage System |
| Virtual Machine B | ConnectedTo | Storage System |

At stage D, the event management system 120 identifies an entry of the event type-relationship type map 126 based, at least in part, on the event type. The entries of event type-relationship type map 126 may be implemented as key-value pairs. Thus, to identify an entry, the event management system 120 may identify an entry that specifies the event type received with event notification A 112 as a key. The identified entry includes the relationship type that corresponds to the event type. Table 2 depicts an example event type-relationship type map.

TABLE 2

| Event Type | Relationship Type |
| --- | --- |
| ComponentInaccessible | ConnectedTo |
| BackupUnavailable | BacksUpTo |
| ShutdownRequest | Manages |

In this particular example, the event type indicates that the detected event is a determination that virtual machine A 108 is inaccessible. Thus, the event management system 120 would identify the first entry of the event type-relationship type map 126 (corresponding to the "ComponentInaccessible" event type) as the correct entry and determine that the corresponding relationship type is a "ConnectedTo" relationship.

At stage E, the event management system 120 identifies relevant components based, at least in part, on the component graph and the event type-relationship type mapping. To identify relevant components, the event management system 120 identifies a source component of the component graph, which may vary based on the event type, component graph layout, etc. The event management system 120 then identifies paths originating at the source component using edges corresponding to the relationship type identified at stage D. In some instances, the event management system 120 may also identify a destination component of the component graph and identify paths that originate at the source component and end at the destination component using edges corresponding to the relationship type identified at stage D.

In this example, the event management system 120 identifies the server management system 102 as the source component, virtual machine A 108 as the destination component, and the "ConnectedTo" relationship type as corresponding to a "ComponentInaccessible" event. Thus, the event management system 120 determines that the path between the server management system 102 and virtual machine A 108 includes router A 104. The event management system 120 thus determines that the server management system 120, router A 104, and virtual machine A 108 are the relevant components. The technique used to in this example to identify the path is discussed in more detail below.

At stage F, the event management system 120 retrieves operational statuses corresponding to the relevant components from the component status database 124. To retrieve the operational statuses, the event management system 120 queries the component status database 124 for the statuses of the relevant components. The query sent to the component status database 124 may thus include identifiers associated with the relevant components. In response to the query, the component status database 124 returns the operational statuses to the event management system 120. Table 3 depicts a table of the component status database 124 used by the event management system 120.

TABLE 3

| Component | Status |
| --- | --- |
| Server Management System | Up |
| Router A | Down |
| Router B | Up |
| Virtual Machine A | Up |
| Virtual Machine B | Up |
| Storage System | Up |

As mentioned above, in this example, the event management system 120 determined that the server management system 102, router A 104, and virtual machine A 108 are the relevant components. The event management system 120 thus queries the component status database 124 for the corresponding operational statuses and determines that the server management system 102 is operational, router A 104 is nonoperational, and virtual machine A 108 is operational.

At stage G, the event management system 120 determines whether to generate an alert based, at least in part, on the event characteristics, the component graph, and the operational statuses. In this example, the event management system 120 determines that the only path to virtual machine A 108 passes through router A 104. Because each component along a path based on "ConnectedTo" relationship types must be operational for a component at the end of the path to be accessible, the event management system 120 determines that virtual machine A 108 is inaccessible because router A 104 is nonoperational. Because the status of router A 104 is known, an alert that virtual machine A 108 is inaccessible would be unnecessary. Thus, the event management system 120 determines that no alert should be generated in response to receiving event notification A 112.

The example depicted in stages A through G depict the event management system 120 determining that an alert should not be generated in response to receiving an event notification. In contrast, stages H through N depict a scenario in which the event management system 120 determines that an alert should be generated in response to receiving an event notification.

At stage H, the server management system 102 determines that virtual machine B 110 is inaccessible. The operations performed by the server management system 102 at stage H can be substantially similar to those performed by the server management system 102 at stage A.

At stage I, the server management system 102 notifies the event management system 120 that virtual machine B 110 is inaccessible. The operations performed by the server management system 102 at stage I can be substantially similar to those performed by the server management system 102 at stage B. The server management system 102 generates event notification B 114, which can be similar to event notification A 112.

At stage J, in response to receiving event notification B 114, the event management system 120 retrieves a component graph from the component graph database 122. The operations performed by the server management system 120 at stage J can be substantially similar to those performed by the server management system 120 at stage C.

At stage K, the event management system 120 identifies an entry of the event type-relationship type map 126 based, at least in part, on the event type. The operations performed by the event management system 120 at stage K can be substantially similar to those performed by the event management system 120 at stage D. As in stage D, the event management system 120 determines that the "ConnectedTo" relationship type corresponds to a "ComponentInaccessible" event type.

At stage L, the event management system 120 identifies relevant components based, at least in part, on the component graph and the event type-relationship type mapping. The operations performed by the event management system 120 can be substantially similar to those performed by the event management system 120 at stage E. In this example, the event management system 120 identifies server management system 102, router B 106, and virtual machine B 110 as the relevant components.

At stage M, the event management system 120 retrieves operational statuses corresponding to the relevant components from the component status database 124. In this example, the event management system 120 determines that the server management system 102 is operational, router B 106 is operational, and that virtual machine B 110 is operational.

At stage N, the event management system 120 determines whether to generate an alert based, at least in part, on the event characteristics, the component graph, and the operational statuses. In this example, the event management system 120 determines that the each of the relevant components has a status indicating that they are operational. As such, virtual machine B 110 should be accessible via the identified path. However, because event notification B 114 indicated that virtual machine B 110 is not accessible, the event management system 120 determines that an alert 128 should be generated.

Path Determination Techniques

The techniques used to identify relevant components can vary based on the event characteristics associated with the detected event. Generally, the event management system 120 identifies one or more paths of the component graph that matches one or more criteria. The particular criteria can vary depending on the event characteristics. For example, the criteria can include a source component (i.e., source node), a destination component (i.e., destination node), and a relationship type (i.e., path selector). The following example scenarios, organized by event type (an example of an event characteristic), help illustrate the variety of techniques that may be used to identify relevant components.

Backup Unavailable—

In some implementations, the event management system 120 may receive an event notification indicating that a backup of a particular primary system is unavailable. The event notification may identify the primary system as well. The components relevant when a backup is unavailable include the primary system itself and the backup system. The event management system 120 thus utilizes the component graph to identify the backup system and any paths between the primary system and the backup system.

Consider a more particular scenario in which the event management system 120 receives an event notification indicating that the backup for virtual machine A 108 is unavailable. To identify the backup system and any paths between the primary system and the backup system, the event management system 120 determines that virtual machine A 108 is the source component. Further, the event management system 120 determines that the relationship type associated with a backup being unavailable is "BacksUpTo" (see Table 2, above). The event management system 120 then utilizes a path discovery technique to identify paths that satisfy the determined criteria (e.g., paths that begin at virtual machine A 108 and use edges specifying a "BacksUpTo" relationship). If applied to the example component graph depicted in FIG. 2, the event management system 120 would identify the path from node 208 (corresponding to virtual machine A 108) to node 211 (corresponding to storage system 111) that uses the "BacksUpTo" edge connecting node 208 to node 211.

Component Inaccessible—

As described above, the event management system 120 may receive an event notification indicating that a particular component is inaccessible. The event notification may identify the component that is unavailable. The components relevant when a backup is unavailable include a management component that monitors the status of the inaccessible component, the inaccessible component itself, and any intermediate component between the management component and the inaccessible component. The event management system 120 thus utilizes the component graph to identify the management component (if necessary) and all components that form paths between the management component and the inaccessible component.

Consider a more particular scenario in which the event management system 120 receives an event notification indicating that virtual machine A 108 is inaccessible, as described above. To identify all paths between the management component and the inaccessible component, the event management system 120 determines that the relationship type associated with a component being inaccessible is "ConnectedTo" (see Table 2, above). The event management system 120 then utilizes a path discovery technique to identify paths that satisfy the determined criteria (e.g., paths that begin at node 202 (corresponding to server management system 102), end at node 208 (corresponding to virtual machine A 108), and use edges specifying a "ConnectedTo" relationship). If applied to the component graph 200 depicted in FIG. 2, the event management system 120 would identify the path as comprising the spans from node 102 to node 204 and from node 204 to node 208.

In some implementations, the management component may be statically identified (e.g., there may be a single management component such as the server management system 102). In some implementations, the event management system 120 may dynamically determine the management component. For example, the event management system 120 may identify server management system 102 as managing virtual machine A 108 based, at least in part, on the "Manages" edge between node 202 and node 208.

Network Performance Falls Below Threshold—

As another example, the event management system 120 may receive an event notification indicating that the network performance does not meet the minimum threshold. The components relevant when the network performance does not meet the minimum threshold are the components used to transport data between a source and destination component (which may be statically assigned for performance testing purposes). The event management system 120 thus utilizes the component graph to identify the paths between the source and destination components.

Consider a more particular scenario in which the event management system 120 receives an event notification indicating that the performance of the network 100 has fallen below a minimum threshold. In this example, assume that the performance of the network is tested by comparing the maximum throughput when writing data from the server management system 102 to the storage system 111. To identify all paths between the server management system 102 and the storage system 111, the event management system 120 may determine that the relationship type associated with network performance is "ConnectedTo". The event management system 120 then utilizes a path discovery technique to identify paths that satisfy the determined criteria (e.g., paths that begin at node 202 (corresponding to server management system 102), end at node 211 (corresponding to storage system 111, and use edges specifying a "ConnectedTo" relationship). If applied to the component graph 200 depicted in FIG. 2, the event management system 120 would identify two paths between node 202 and node 211: a first path that includes node 204 and node 208 and a second path that includes node 206 and node 210. The event management system 120 may determine that because router A 104 is indicated as nonoperational, only one of two paths is available, thus reducing the amount of data that can be transmitted to the storage system 111. Because the status of router A 104 is known, the event management system 120 may determine that generating an alert about the network performance is unnecessary (because an administrator might be aware that network performance would be severely degraded when one of two data paths is unavailable).

Variations

Although the examples above are fairly simple in order to avoid obfuscating the disclosures, the techniques used to identify paths between components can be more complex. For example, multiple paths may exist, which may necessitate analysis of each path as it pertains to the particular event detected. Further, the granularity at which components are identified can vary. For example, the server management system 102 may include multiple network interfaces, which may be depicted as individual components within the component graph.

The example depicted in FIG. 1 describes using an event type to determine the relationship type and whether to generate an alert. An event type is an example of an event characteristic. The event management system 120 can use a variety of event characteristics in place of, or in addition to, an event type. For example, another event characteristic may be a failed test that led to the generation of the event notification, such as one or more "ping" test. Ping tests may fail when the event management system 120 and/or other components do not receive responses to a certain number of ping messages sent to a component within a particular time period (i.e., when the ping test reveals packet loss greater than a threshold). Another example of a test that may be used is a network performance test, as described above.

Another event characteristic that might be used to determine whether to generate an alert is an event severity. For example, if an event notification is received indicating a lower event severity than a previous, related event, the event management system 120 may determine that an alert need not be generated. If an event notification is received indicating a higher event severity than a previous, related event, the event management system 120 may determine that an alert should be generated.

Some event characteristics may be proxies of each other. For example, an event notification may indicate an event type of "ComponentInaccessible" when a ping test fails.

The examples depicted in FIG. 1 describe the event management system 120 determining whether an alert should be generated. An alert is a specific example of a type of event notification that is designed to alert a user or other component. The techniques described herein can apply to any type of event notification, not just alerts. Further, the techniques can apply to other operational aspects of the event management system. For example, the event management system 120 may determine how to process a received event notification based on an analysis of a component graph.

The examples above depict just a few of the possible event characteristics that might be analyzed using a component graph. The particular event characteristics may vary between implementations.

In some implementations, the component graph and the operational statuses may be stored in a data source other than a database. For example, the component graph may be stored as a file on a storage device. Similarly, the event type-relationship type map 126 may be stored in a database and the appropriate event-type-relationship type map entry may be retrieved by querying the database.

Some or all of the operations performed by the event management system 120 may be encoded as rules. For example, a particular rule may encode logic indicating that no alert is generated if a path to an inaccessible component includes a component with an operational status of "down". As another example, a particular rule may encode logic indicating that an event type of "ComponentInaccessible" is associated with a "ConnectedTo" relationship. The rules may be stored in a database, allowing functionality to be added, removed, or updated dynamically. A component graph can thus be used to enhance a rule-based event management system.

FIG. 1 is annotated with a series of letters A through N. These letters represent stages of operations. Although these stages are ordered for this example, the stages illustrate examples to aid in understanding this disclosure and should not be used to limit the claims. Similarly, some stages may be optional. Subject matter falling within the scope of the claims can vary with respect to the operations performed and the order in which the operations are performed.

Figure 3:
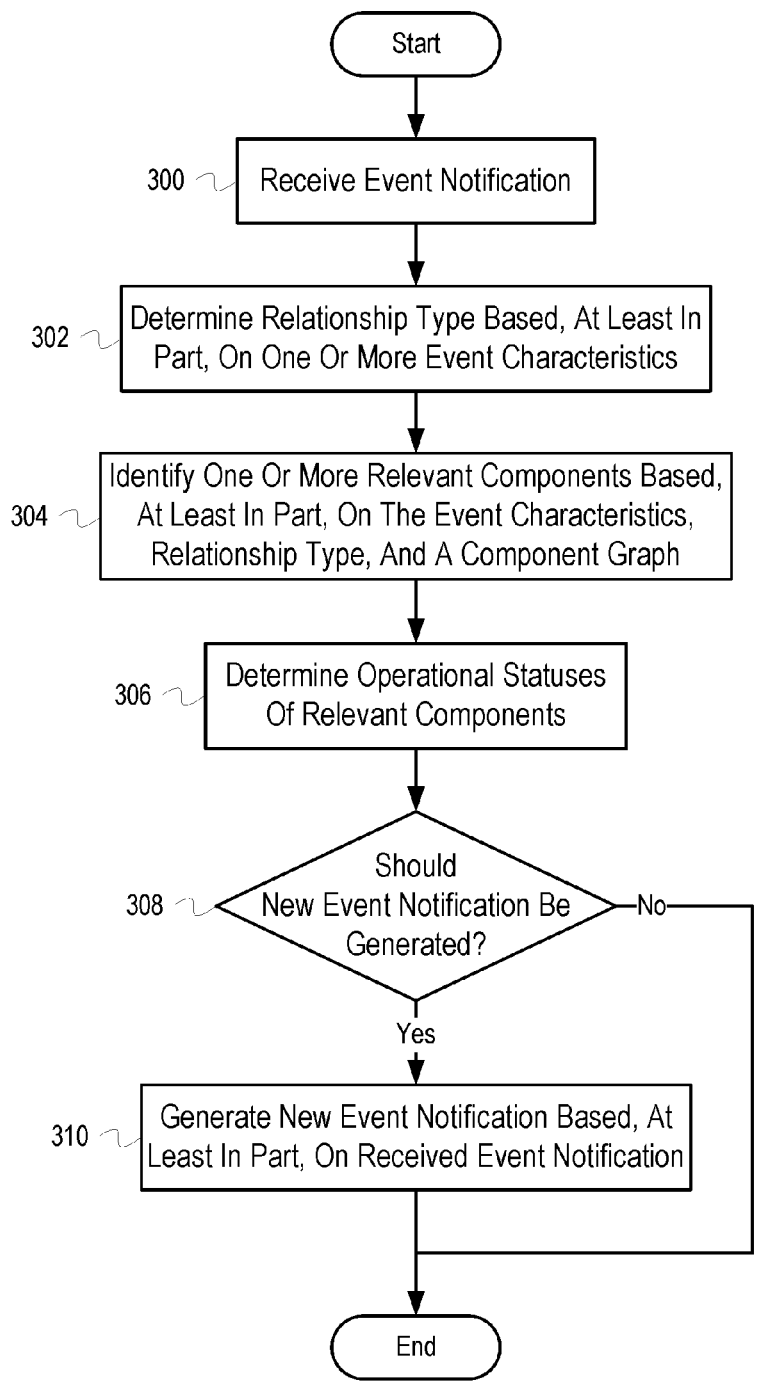
FIG. 3 is a flowchart that depicts example operations for generating an event notification based, at least in part, on a component graph.

FIG. 3 is a flowchart that depicts example operations for generating an event notification based, at least in part, on a component graph. The operations of FIG. 3 can be performed by an event management system, such as the event management system 120 of FIG. 1, or any suitable component.

Initially, an event management system receives an event notification (300). The event notification includes metadata associated with a detected event. For example, the metadata can include event characteristics, such as an event indicator (e.g., an event type, indication of a failed test, etc.), a timestamp, an event severity, etc. If the detected event is associated with a particular component or set of components, the metadata can identify the associated components (e.g., using component identifiers). The event indicator can identify the type of event. For example, the event indicator may indicate that a component was determined to be inaccessible, that a metric exceeded a threshold, etc.

After receiving the event notification, the event management system determines a relationship type based, at least in part, on one or more event characteristics (302). The event characteristics may be determined using the metadata from the event notification. To determine the relationship type, the event management system can identify an entry corresponding to the event characteristics in an event type-relationship type map (or similar data structure). In some implementations, the event type-relationship type map may be implemented as part of a database and the event management system determines the relationship type by querying the database.

After determining the relationship type, the event management system identifies one or more relevant components based, at least in part, on the event characteristics, relationship type, and a component graph (304). The particular analysis of the component graph performed by the event management system can vary based on the event characteristics, component graph, etc. Generally, however, the event management system identifies paths between a plurality of components based on the relationship type. In particular, a component graph includes a set of nodes, corresponding to components, connected by edges, corresponding to relationships. The event management system uses a path discovery technique to identify paths within the component graph that meet one or more criteria. The criteria are determined based, at least in part, on the event characteristics. For example, if the event characteristics indicate that a component is inaccessible to a management component, the criteria may include a source node corresponding to the management component, a destination node corresponding to the inaccessible component, and edges corresponding to a "ConnectedTo" relationship type. As another example, if the event characteristics indicate that a backup of a component (such as a virtual machine or storage system) is unavailable, the criteria may include a source node corresponding to the component and edges corresponding to a "BacksUpTo" relationship type. Once the one or more paths are discovered, the event management system identifies the components that make up the path as the relevant components.

After identifying the relevant components, the event management system determines operational statuses of the relevant components (306). To identify the operational statuses of the relevant components, the event management system can query a component database that includes the operational statuses of the relevant components.

After determining the operational statuses of the relevant components, the event management system determines whether a new event notification should be generated based, at least in part, on the event characteristics, component graph, and/or operational statuses (308). The particular analysis performed to determine whether a new event notification should be generated can vary. Generally, the event management system determines whether an operational status of a relevant component might result in the detected event and whether the operational status makes an additional event notification redundant or otherwise unnecessary. For example, if a particular component is inaccessible, the event management system may determine whether one or more relevant components have an operational status that would preclude communication with the destination component. If the operational status of a relevant component would preclude communication with the destination component, the event management system determines that no new event notification should be generated, since the operational status is already known. The operational status need not merely indicate whether the component is operational or nonoperational, but may encompass various aspects of the component's operation. For example, the operational status may indicate that a particular component is experiencing high traffic. Further, the event management system may determine whether an administrator or other user has been alerted to the operational status. The event management system may use a rule-based system to determine whether a new event notification should be generated. If the event management system determines that a new event notification should be generated, control flows to block 310. If the event management system determines that no new event notification should be generated, the process ends.

After determining that a new event notification should be generated, the event management system generates a new event notification based, at least in part, on the received event notification (310). The event management system may generate an event notification that is sent to an administrator or other user, for example. After the event management system generates the new event notification, the process ends.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium does not include transitory, propagating signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
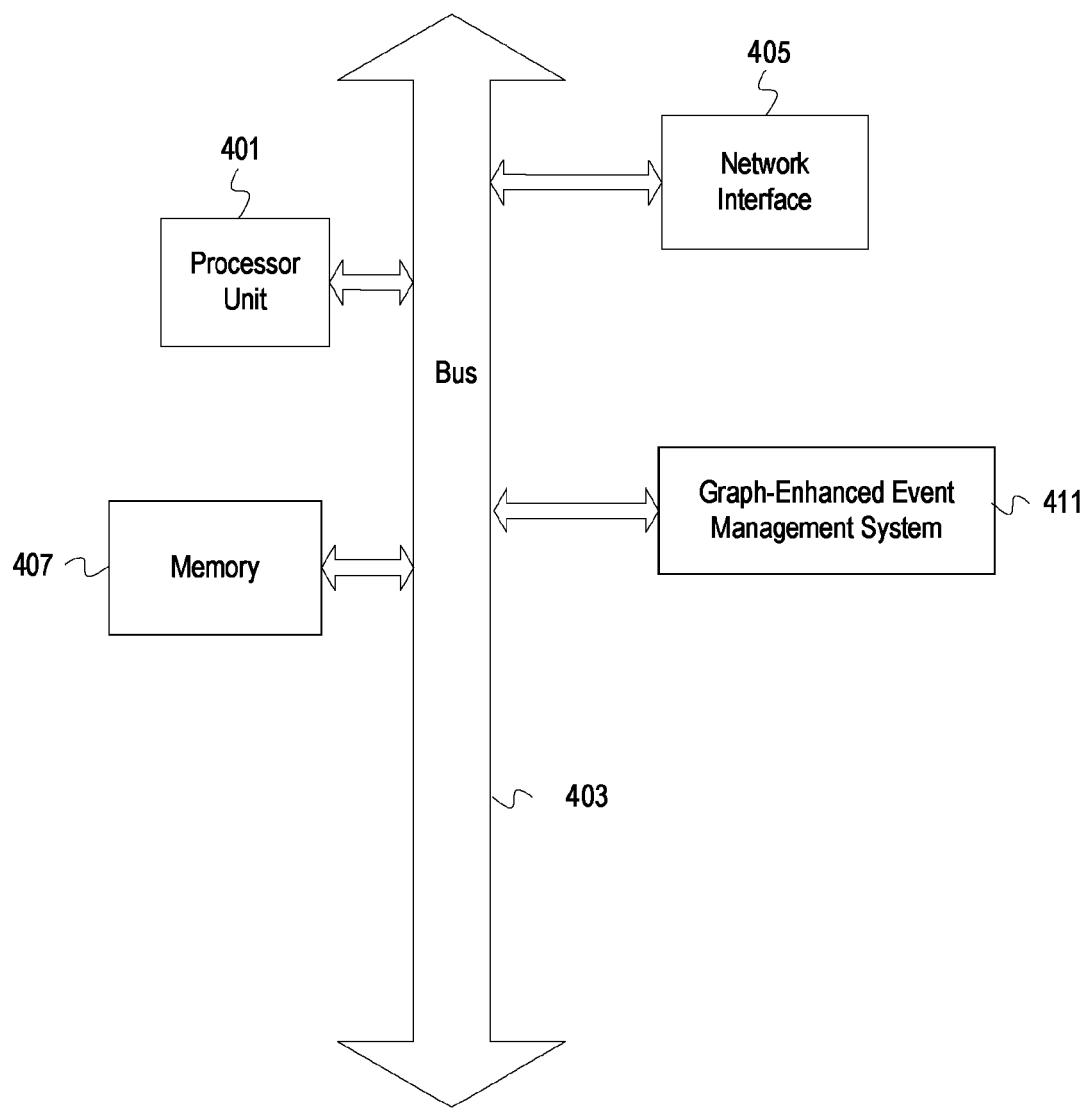
FIG. 4 depicts an example computer system with a graph-enhanced event management system.

FIG. 4 depicts an example computer system with a graph-enhanced event management system. The computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The computer system also includes a graph-enhanced event management system 411. The graph-enhanced event management system 411 may receive event notifications, identify components relevant to the event notification based on an one or more event characteristics, a relationship type, and a component graph. The graph-enhanced event management system 411 may use operational statuses of the relevant components to determine whether to generate new event notifications. Any one of the previously described functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor unit 401.

While the aspects of the disclosure are described with reference to various implementations and exploitations, it will be understood that these aspects are illustrative and that the scope of the claims is not limited to them. In general, techniques for managing event notifications as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method comprising:
receiving a first event notification, wherein the first event notification is associated with a first event at a first component and a second component;
determining criteria based, at least in part, on the first event notification;
identifying a third component based, at least in part, on the criteria and a component graph indicating a relationship between the first component and the second component, wherein identifying the third component based, at least in part, on the component graph comprises:
identifying a first node of the component graph which represents the first component and a second node of the component graph which represents the second component;
determining that a path in the component graph between the first node and the second node comprises a third node which represents the third component; and
identifying an edge between the first node and the third node, wherein the edge indicates a first relationship type between the first component and the third component;
determining an operational status associated with the third component; and
determining not to generate a second event notification for the first component based, at least in part, on the operational status associated with the third component and the first relationship type between the first component and the third component.

2. The method of claim 1, wherein determining the criteria comprises:
determining a second relationship type for the relationship between the first and the second components.

3. The method of claim 2, wherein the second relationship type is determined based, at least in part, on an event characteristic associated with the first event.

4. The method of claim 2, wherein determining the second relationship type for the relationship between the first and the second components comprises:
determining a path in the component graph between the first component and the second component which indicates the second relationship type.

5. The method of claim 1, wherein determining not to generate the second event notification comprises determining that there is an association between the first event and the operational status.

6. The method of claim 1, wherein determining not to generate the second event notification comprises determining that the operational status indicates that the third component is not operational.

7. One or more machine readable storage media having program code stored therein, the program code comprising program code to:
receive a first event notification, wherein the first event notification is associated with a first event at a first component and a second component;
determine criteria based, at least in part, on the first event notification;
identify a third component based, at least in part, on the criteria and a component graph indicating a relationship between the first component and the second component, wherein the program code to identify the third component based, at least in part, on the component graph comprises program code to:
identify a first node of the component graph which represents the first component and a second node of the component graph which represents the second component;
determine that a path in the component graph between the first node and the second node comprises a third node which represents the third component; and
identify an edge between the first node and the third node, wherein the edge indicates a first relationship type between the first component and the third component;
determine an operational status associated with the third component; and
determine not to generate a second event notification for the first component based, at least in part, on the operational status associated with the third component and the first relationship type between the first component and the third component.

8. The one or more machine readable storage media of claim 7, wherein the program code to determine the criteria comprises program code to:
determine a second relationship type for the relationship between the first component and the second component based, at least in part, on the first event notification.

9. The one or more machine readable storage media of claim 8, wherein the first event notification indicates that the second component is not accessible, wherein the third component is a network device that communicatively couples the first component and the second component.

10. The one or more machine readable storage media of claim 9, wherein the program code to determine not to generate the second event notification for the first component comprises program code to determine that the operational status indicates that communications sent from the first component to the second component via the third component would not reach the second component.

11. An apparatus comprising:
a processor; and
a machine readable medium having program code stored thereon, the program code comprising program code executable by the processor to cause the apparatus to,
receive a first event notification, wherein the first event notification is associated with a first event at a first component and a second component;
determine criteria based, at least in part, on the first event notification;
identify a third component based, at least in part, on the criteria and a component graph indicating a relationship between the first component and the second component, wherein the program code executable by the processor to cause the apparatus to identify the third component based, at least in part, on the component graph comprises program code executable by the processor to cause the apparatus to:
identify a first node of the component graph which represents the first component and a second node of the component graph which represents the second component;
determine that a path in the component graph between the first node and the second node comprises a third node which represents the third component; and
identify an edge between the first node and the third node, wherein the edge indicates a first relationship type between the first component and the third component;

determine an operational status associated with the third component; and determine not to generate a second event notification for the first component based, at least in part, on the operational status associated with the third component and the first relationship type between the first component and the third component.

12. The apparatus of claim 11, wherein the program code executable by the processor to cause the apparatus to determine the criteria comprises program code executable by the processor to cause the apparatus to:

determine a second relationship type for the first component and the second component based, at least in part, on the first event notification.

13. The apparatus of claim 12, wherein the first event notification indicates that the second component is not accessible, wherein the third component is a network device that communicatively couples the first component and the second component.

14. The apparatus of claim 13, wherein the program code executable by the processor to cause the apparatus to determine not to generate the second event notification for the first component comprises program code executable by the processor to cause the apparatus to determine that the operational status indicates that communications sent from the first component to the second component via the third component would not reach the second component.

15. The apparatus of claim 11, wherein the program code further comprises program code executable by the processor to cause the apparatus to:

receive a third event notification, wherein the third event notification is associated with a second event;

determine second criteria based, at least in part, on the third event notification;

identify a fourth component based, at least in part, on the second criteria and the component graph;

determine an operational status associated with the fourth component;

determine to generate a fourth event notification based, at least in part, on the operational status; and in response to the determination to generate the fourth event notification, generate the fourth event notification.

* * * * *